June 19, 1951 G. E. GLISS 2,557,738
APPARATUS FOR MEASURING EXTRUSION PRESSURES
Filed April 25, 1947
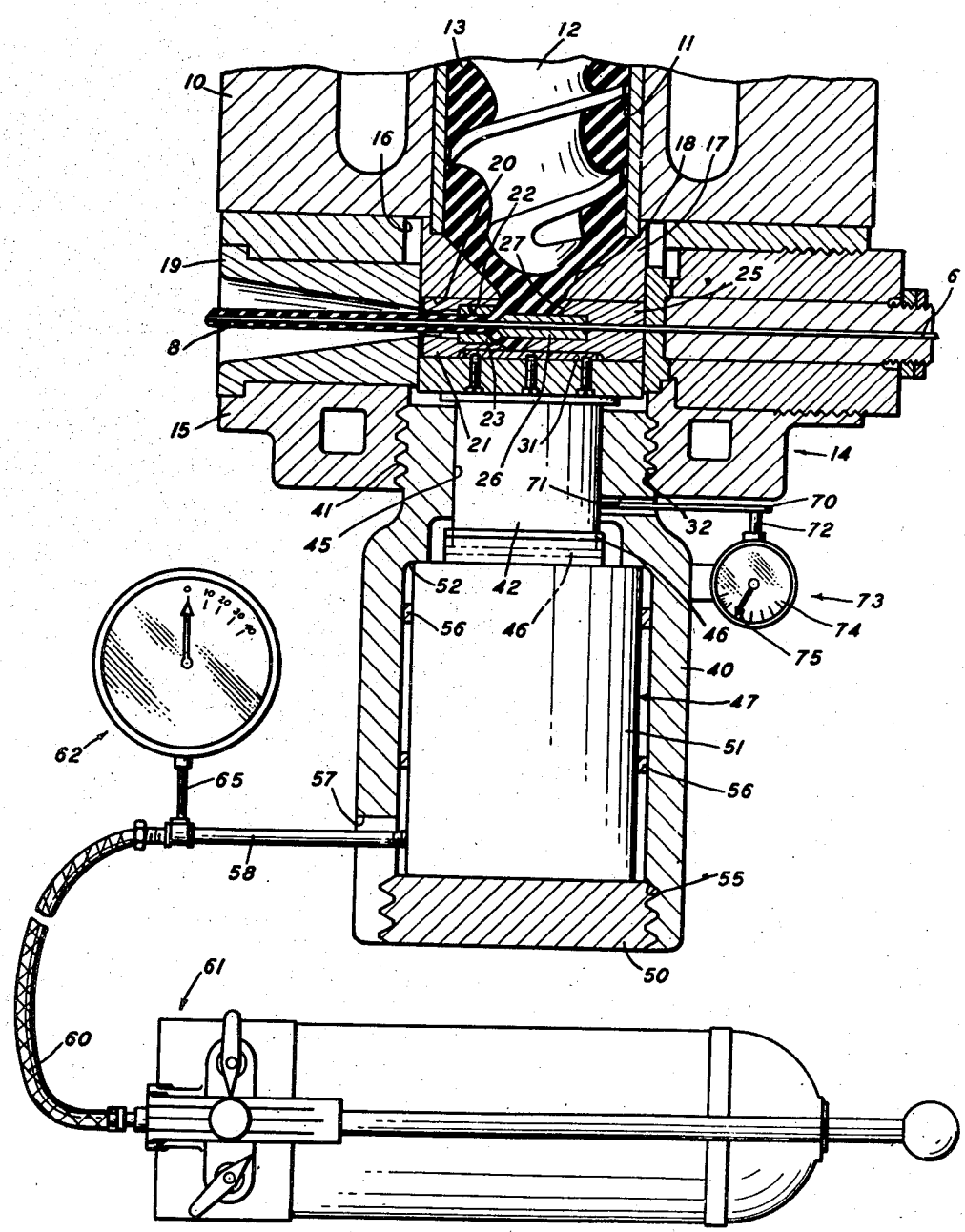
INVENTOR
G.E. GLISS
BY [signature]
ATTORNEY Patented June 19, 1951

2,557,738

UNITED STATES PATENT OFFICE 2,557,738

APPARATUS FOR MEASURING EXTRUSION PRESSURES

George E. Gliss, Baltimore, Md., assignor to Western Electric Company, Incorporated, New York, N. Y., a corporation of New York Application April 25, 1947, Serial No. 743,915

5 Claims. (Cl. 73—140)

This invention relates to apparatus for measuring extrusion pressures, and more particularly to apparatus for measuring the pressure on material being extruded over conductors.

In the manufacture of the insulated and jacketed conductors, a conductor, which may be bare or covered, is sometimes advanced continuously through an extrusion head of an adjustable extruding apparatus of a type which includes an extrusion passage in which an extrusion die is mounted and in which a core tube and a core-tube-holder are positioned for centering the conductor with respect to the extrusion die. The extrusion apparatus forces insulating material into a covering around the conductor. The insulating material is brought to the extrusion apparatus in batches, and the extrudability of the batches of insulating material may vary one from another. When the extrudability varies, it necessitates readjusting the extrusion process for each batch of the insulating material varying in extrudability from the preceding batch.

In the past, there has been no satisfactory means for determining the extrudability of each batch of insulating material without long experimentation, and the extrudability had to be determined by trial and error methods. One of the main reasons that the extrudability of batches of insulating material could not be ascertained was that there has been no means available for measuring the pressure of the insulating material as it was extruded. The high extrusion pressures of the insulating material in the extruding apparatus aggravated the problem since they made imperative pressure testing apparatus which would satisfactorily withstand these high pressures.

An object of the invention is to provide new and effective apparatus for measuring extrusion pressures.

A further object of the invention is to provide new and effective apparatus for measuring the extrusion pressure of material being extruded without interfering with the extrusion operation.

Still another object of the invention is to provide new and effective apparatus for measuring extrusion pressures, which is designed to be used with known extruding apparatus without necessitating extensive modification of the extruding apparatus.

An apparatus illustrative of certain features of the invention includes a flask having a threaded portion designed to be screwed into an opening in an extrusion head and a ram designed to hold extrusion tools in place against the pressure of insulating material being forced through the extrusion head. A hydraulic system is provided for applying a predetermined pressure to the ram, and a gage serves to measure the pressure applied to the ram. The gage measures any increase in pressure of the hydraulic fluid due to the pressure exerted upon the ram by the insulating material so that the pressure of the insulating material may be measured thereby.

A complete understanding of the invention may be obtained from the following detailed description, when read in conjunction with the appending drawing, in which the only figure is a partially sectional view of an apparatus for measuring extrusion pressures illustrating certain features of the invention.

Referring now in detail to the drawing, there is shown therein a continuous extruding apparatus provided with pressure measuring apparatus illustrating certain features of the invention. The continuous extruding apparatus is designed to apply a covering 8 of plastic material, such as, for example, compound including rubber or a rubber-like material, upon a filamentary conductor 6, which may be bare or covered with a textile or plastic covering. This apparatus includes an extrusion cylinder 10 having a bore 11 formed therein, in which a stock screw 12 is rotatably mounted. The stock screw is rotated by suitable driving means, such as an electric motor (not shown), to force the plastic material 13 through an extruding head 14 under high pressure. The extruding head includes a body member 15 having a bore 16 in which is slidably mounted tool holder 17, which abuts an end of the extrusion cylinder 10. The tool holder has a tapered opening 18, which forms a continuation of the bore 11, and communicates with an extrusion passage 20 formed therein. A tube 19 is carried by the head in alignment with the extrusion passage 20.

An annular die holder 21 mounted in the exit end of the extrusion passage 20 in the tool holder 17 has a bore 22 formed therein in which a forming die 23 is mounted. The conductor 6 is advanced toward the left, as viewed in the drawing, by suitable core-advancing means, such as a capstan (not shown), through a core-tube-holder 25 and a core tube 26. The core-tube-holder 25 is provided with an inclined surface 27 for deflecting the plastic material 13 toward the die 23, and an aligning plate 31 bolted to the tool holder 17 maintains the die holder 21 and the core-tube-holder 25, and thereby the core tube 26 and the die 23, aligned with each other in the extrusion passage 20. A threaded portion 32 is provided in the bore 16 in the member 15 of the extrusion head 14, and the tool holder carrying the die holder 21, the die 23, the core-tube-holder 25, the core tube 26 and the aligning plate 31 may be inserted into the bore 16 or be removed therefrom.

A flask 40 having a threaded neck portion 41 is designed to be threaded into the threaded portion 32 of the bore 16 in the body member 15. A plunger 42 is mounted slidably in a bore 45 formed in the neck portion of the flask 40, and is designed to engage the tool holder 17 when pressed upwardly, as viewed in the drawing, by a piston 46 of a hydraulic ram unit 47. The ram unit 47 is mounted in the flask 40, and is secured therein by a plug 50 of the flask 40. A cylinder 51 of the ram unit 47 is held against an annular shoulder 52 of the flask 40 by the plug 50, which is threaded into a tapered opening 55 formed in the flask. Rings 56—56 serve to center the cylinder 51 in the flask 40.

The flask 40 is provided with a slot 57 to provide clearance when the cylinder 51 is inserted in the flask 40 for a pipe 58 communicating with the lower end of the cylinder 51. A flexible hose 60 is connected to the pipe 58 and to a manually operable pump unit 61 of a well known type, and a pressure gage 62 is connected by a pipe 65 to the pipe 58.

A finger 70 fastened rigidly to the plunger 42 projects through a slot 71 formed in the flask 40, and engages a spring-loaded plunger 72 of a high-sensitivity dial indicator 73 of a well known type. The dial indicator includes a dial 74 calibrated in thousandths of an inch and a pointer 75 movable along the dial by the spring-loaded plunger 72. The dial indicator serves to indicate the relative positions up or down, as viewed in the drawing, in the extruding head of the die holder 21, the die 22, the core-tube-holder 25, the core tube 26 and aligning plate 31.

In the operation of the apparatus described hereinabove, the die holder 21, the die 22, the core-tube-holder 25, the core tube 26, and the aligning plate 31 are mounted in the tool holder 17, which then is inserted into the bore 16 in the body member 15. The flask 40 with the plunger 42 is threaded into the threaded portion 32 of the bore 16, and the ram unit 47 is secured in the flask. The hose 60 then is connected to the pipe 58, and the manually operable pump unit 61 is actuated to supply a hydraulic fluid through the hose 60 and the pipe 58 into the lower end of the cylinder 51, as viewed in the drawing. The fluid pumped into the lower end of the cylinder 51 moves the ram 46 from its broken line position to its full line position. The ram 46 forces the plunger 42 upwardly, and forces the tool holder 17 against the end of the extruding cylinder 10. In this position of the tool holder, the aligning plate 31, the annular die holder 21, and the core-tube-holder 25 are held in correct extruding positions. The dial indicator 73 indicates when the tool holder is properly located in the bore 16.

The unit 61 is actuated until the indicator 62 reads zero, at which time the hydraulic liquid in the cylinder 51 will be under a predetermined pressure, and the pump unit 61 is actuated to prevent flow of the hydraulic liquid back thereto. Insulating material 13 is then introduced into the bore 11 in the extrusion cylinder 10, and the stock screw 12 is rotated to force the insulated material through the bore 11 and the opening 18 against the core-tube-holder 25, the core tube 26, the die holder 21, the die 23, and the aligning plate 31.

The total resultant force of the insulating material 13 in a downward direction upon the tool holder 17 is equal to the pressure of the material times the area of the exit of the extruding cylinder 10, which is known. Hence, this resultant force is directly proportional to the pressure on the insulating material. This force is transmitted by these elements to the plunger 42, which transmits it to the ram 46. The ram 46 transmits this force to the hydraulic liquid in the cylinder 51, and this force increases the pressure on the hydraulic liquid in direct proportion to the pressure of the insulating material 13. The increase in pressure on the hydraulic liquid is indicated by the gage 62, which is calibrated in units of pressure of the insulating material. Hence, at any particular time while the insulating material 13 is being extruded, its extrusion pressure will be shown directly on the gage 62. If desired, the gage 62 may be calibrated so that its zero point is indicated when there is no pressure on the hydraulic liquid, and an initial reading obtained after the pump unit is actuated to locate the tool holder 17 correctly but before there is any component of pressure from the material to be extruded. The material may then be extruded and the pressure thereon at any time be determined by taking the reading at that time and subtracting the initial reading therefrom.

The above-described pressure measuring device serves to hold the tool holder in a position such that it holds the extruding tools, the die 22, the core-tube-holder 25, the core tube 26, in correct extruding positions in the extruding head 14. The extruding head 14, the tool holder, the extruding tools and the extrusion cylinder 10, which form a well known type of extruding apparatus need not be changed at all in structure to fit the extruding apparatus to the pressure measuring apparatus, as no adaptation is necessary. The pressure measuring apparatus merely may be substituted for a retaining nut which ordinarily is threaded into the threaded opening 32 to hold the tool holder in correct extruding position in the head 14. The extruding capability of the extruding apparatus is not impaired in the slightest by the addition of the pressure measuring apparatus thereto. Also, the entire pressure measuring device is separable and portable so that it may be used selectively with any of several extruding apparatus, if such use is found to be desirable for any reason.

The pressure measuring apparatus is simple in its structure and operation so that it requires a minimum maintenance. Furthermore, it occupies very little space and does not interfere in the slightest with extruding operations.

What is claimed is:

1. In an extruding apparatus including extruding tools, an extruding head having an extrusion opening therein, a threaded opening in communication with the extrusion opening to permit the extruding tools to be inserted in the extrusion passage and means for forcing plastic material through the extrusion passage, the improvement comprising a hydraulic cylinder having a threaded end portion designed to be threaded into the threaded opening in the extruding head, a piston mounted slidably with respect to the cylinder, means for forcing a liquid into one end of the cylinder to force the piston against extruding tools positioned in the extrusion opening in the extruding head to hold the extruded tools in extruding positions therein, and indicating means responsive to the pressure on the liquid for measuring the pressure of plastic material being forced through the extrusion opening.

2. In an extruding apparatus including an extruding head having an extrusion passage therein and a bore communicating from the exterior of the head to the extrusion passage and means for forcing plastic material through the extrusion bore, a pressure-measuring device which comprises a piston mounted slidably in the bore in the extruding head, a cylinder containing the piston, means for locking the cylinder to the extruding head, a closed system of a liquid serving to support the piston, and means responsive to the pressure on the liquid for indicating the pressure of plastic material forced through the extrusion passage in the extruding head.

3. In an extrusion apparatus including an extruding head having an extrusion passage therein and a tapped bore in communication with the extrusion passage, and means for forcing plastic material through the extrusion passage, the combination of a cylinder, means having a threaded end portion designed to be threaded into the tapped bore in the extruding head for locking the cylinder to the head, a piston mounted slidably in the cylinder, means for transmitting force from plastic material extruded from the extrusion passage to the piston, a closed system of a hydraulic liquid for supporting the piston, and means responsive to changes of pressure on the hydraulic liquid for measuring the pressure of the plastic material being extruded.

4. In an extrusion apparatus including an extruding head having an extrusion passage and also being provided with a threaded opening communicating with the passage, a device for measuring the pressure of plastic material forced through the passage which comprises a flask having a threaded neck portion designed to be threaded into the threaded opening in the head, a hydraulic cylinder mounted in the flask, a hydraulic liquid confined in the cylinder, a ram connected operatively to the liquid in the cylinder and projecting through the neck of the flask, said ram serving to transmit force from the plastic material to the liquid, and means responsive to the pressure on the liquid for measuring the pressure on the plastic material.

5. In an extrusion apparatus including an extruding head having an extrusion opening therein and also being provided with a tapped bore extending from the extrusion opening to the exterior of the head, means for forcing plastic material through the extruding head, extruding tools and a tool holder insertable into the extrusion opening through the tapped bore in the head for forming plastic material forced through the head, a device for measuring the pressure of the material and for holding the tool holder in place in the extrusion passage which comprises a hydraulic cylinder, a flask secured to the cylinder and having a threaded neck portion designed to be threaded into the tapped bore in the end for locking the cylinder to the head, a ram carried slidably by the cylinder, means for forcing a hydraulic liquid into an end of the cylinder to force the ram against the tool holder to hold it against dislocation in the head, said ram serving to transmit force from the plastic material to the hydraulic liquid, and means for measuring the component of the pressure on the liquid due to the pressure on the plastic material.

GEORGE E. GLISS.

REFERENCES CITED

The following references are of record in the file of this patent:

UNITED STATES PATENTS

| Number | Name | Date |
|---|---|---|
| 1,826,732 | Chatillon | Oct. 13, 1931 |
| 2,457,902 | Jones | Jan. 4, 1949 |

FOREIGN PATENTS

| Number | Country | Date |
|---|---|---|
| 450,070 | Great Britain | July 9, 1936 |